United States Patent
Heule et al.

(10) Patent No.: US 7,740,427 B2
(45) Date of Patent: *Jun. 22, 2010

(54) DRILL PLATE WITH A CLAMPING ATTACHMENT IN A BASE BODY

(75) Inventors: Heinrich Heule, Au (CH); Harry Studer, Balgach (CH)

(73) Assignee: Ulf Heule, Balgach (CH)

( * ) Notice: Subject to any disclaimer, the term of this patent is extended or adjusted under 35 U.S.C. 154(b) by 78 days.

This patent is subject to a terminal disclaimer.

(21) Appl. No.: 11/961,697

(22) Filed: Dec. 20, 2007

(65) Prior Publication Data

US 2008/0166197 A1 Jul. 10, 2008

Related U.S. Application Data

(63) Continuation of application No. 10/985,328, filed on Nov. 10, 2004, now Pat. No. 7,311,480.

(30) Foreign Application Priority Data

Nov. 14, 2003 (DE) .................................. 10353514

(51) Int. Cl.
*B23B 51/02* (2006.01)

(52) U.S. Cl. .................... 408/233; 408/713; 407/48

(58) Field of Classification Search ............... 408/227, 408/231, 233, 713; 407/33, 40, 47, 48; *B23B 51/02*
See application file for complete search history.

(56) References Cited

U.S. PATENT DOCUMENTS

| 262,588 A | 8/1882 | Hartshorn |
| 2,328,629 A | 9/1943 | Eich et al. |
| 3,443,459 A | 5/1969 | Mackey et al. |
| 4,065,224 A | 12/1977 | Siddall |
| 4,116,580 A | 9/1978 | Hall et al. |
| 4,222,690 A | 9/1980 | Hosoi |
| 4,337,677 A | 7/1982 | Rauckhorst et al. |

(Continued)

FOREIGN PATENT DOCUMENTS

DE    3628262    1/1988

(Continued)

*Primary Examiner*—Eric A Gates
(74) *Attorney, Agent, or Firm*—Wood, Herron & Evans, LLP

(57) ABSTRACT

A drilling tool cuffing insert adapted to be clamped in a rotatably driven drilling tool base body, the base body having a mounting groove formed in an end thereof defined by a pair of clamping jaws, each of the jaws having a bore therethrough, one of the bores being threaded, the bores for receiving a mounting screw for clamping said cuffing insert in the mounting groove, each of the jaws having a centering face, the cuffing insert comprising a plate-shaped cuffing element having a first end, a second opposite end, and a bore therethrough for receiving the mounting screw, the first end of the cuffing element having a pair of mutually opposing cuffing edges, the element having a chip face extending from each cuffing edge to the second end of the element, each of the chip faces having a centering fin with a centering face thereon, the cuffing element centering faces adapted to engage with the centering faces on the jaws of the base body to center the cuffing insert in the base body.

16 Claims, 4 Drawing Sheets

U.S. PATENT DOCUMENTS

| | | | |
|---|---|---|---|
| 4,565,473 A | 1/1986 | Hosoi | |
| 4,566,828 A | 1/1986 | Reinauer | |
| 4,687,387 A | 8/1987 | Roos | |
| 4,744,704 A | 5/1988 | Nils | |
| 4,744,705 A | 5/1988 | Imanaga | |
| 4,802,799 A | 2/1989 | Rachev | |
| 4,854,789 A | 8/1989 | Evasanko, Jr. | |
| 4,950,108 A | 8/1990 | Roos | |
| 5,599,145 A * | 2/1997 | Reinauer et al. | 408/233 |
| 5,782,589 A | 7/1998 | Cole | |
| 5,904,455 A | 5/1999 | Krenzer et al. | |
| 6,012,881 A | 1/2000 | Scheer | |
| 6,132,149 A | 10/2000 | Howarth et al. | |
| 6,158,927 A | 12/2000 | Cole et al. | |
| 6,196,769 B1 | 3/2001 | Satran et al. | |
| 6,514,019 B1 | 2/2003 | Schulz | |
| 6,530,728 B2 | 3/2003 | Eriksson | |
| 6,551,036 B2 | 4/2003 | Heule | |
| 6,899,495 B2 | 5/2005 | Hansson | |
| 7,008,150 B2 | 3/2006 | Krenzer | |
| 7,048,480 B2 | 5/2006 | Borschert et al. | |
| 7,168,893 B2 * | 1/2007 | Takiguchi | 408/233 |
| 7,182,556 B2 * | 2/2007 | Takiguchi et al. | 408/59 |
| 2001/0031182 A1 | 10/2001 | Widin | |
| 2002/0114675 A1 | 8/2002 | Krenzer | |
| 2005/0135888 A1 | 6/2005 | Stokey et al. | |

FOREIGN PATENT DOCUMENTS

| | | | |
|---|---|---|---|
| DE | 4403300 | | 8/1995 |
| DE | 19736598 | | 3/1999 |
| DE | 20304622 | | 7/2003 |
| DE | 10307213 | A1 | 9/2004 |
| DE | 102005012026 | | 9/2006 |
| GB | 2184046 | | 6/1987 |
| JP | 54026591 | | 2/1979 |
| JP | 56015907 | | 2/1981 |
| JP | 10193334 | | 7/1998 |
| JP | 2000084718 | | 3/2000 |
| WO | WO03/047797 | * | 6/2003 |

* cited by examiner

DRILL PLATE WITH A CLAMPING ATTACHMENT IN A BASE BODY

RELATED APPLICATIONS

This application is a continuation of application Ser. No. 10/985,328 filed Nov. 10, 2004, now U.S. Pat. No. 7,311,480 issued Dec. 25, 2007, which is hereby incorporated by reference herein as if fully set forth in its entirety.

FIELD OF THE INVENTION

The invention relates to a drill plate with a clamping attachment in a rotatably driven base body forming on one of its end faces a centering groove that is open towards the top, wherein the centering groove is bonded by at least two opposing mounting jaws, with at least one centering face which is located in the region of the mounting jaws for providing a centering contact with the drill plate (1), with the clamping attachment provided by a mounting screw which centers the drill plate in the centering groove.

DESCRIPTION OF THE RELATED ART

The drill plate with a clamping attachment in a base body has been disclosed, for example, in DE 197 36 598 C2. The upper end face of the base body hereby forms a groove that is open towards the top and in which the drill plate can be inserted. A clamping slot through which an associated clamping screw extends is arranged in the bottom of the groove.

According to the embodiment disclosed in DE 197 36 598 C2, the drill plate has diametrically opposing adjustable stop faces formed by threaded screws which are located in corresponding clamping jaws in the base body and shaped to be adjustable therein. The bolt side of the screws is supported on diametrically opposing stop faces on the drill plate.

When the drill plate is inserted into the base body, the drill plate is therefore slightly rotated about a rotation angle against the operating direction of the drill, so that the contact faces in the clamping jaws (formed by the bolt-side ends of the adjustment screws) and the associated contact faces in the drill plate contact each other for transmitting the load.

The connection is secured and formfittingly maintained by tightening a clamping screw that extends through the clamping slot.

This known arrangement has the disadvantage that the adjustment step for centering the drill plate in the base body is quite complex due to the diametrically opposing adjustment elements. Each adjustment screw has to be separately adjusted with a corresponding adjustment tool, so that the drill plate can be preliminarily centered in the base body.

Using these adjustment screws is not only complex, but disadvantageously, the clamping screw also has to be manipulated so as to finally secure the drill plate in the base body.

Accordingly, three separate elements have to be adjusted, which makes the adjustment so complex.

Disadvantageously, the adjustment elements formed by the two diametrically opposing adjustment screws are located in a different plane from the clamping screw that extends through the clamping slot.

Transfer of the clamping force to the drill plate is therefore inadequate, because the receiving opening for the drill plate has an approximately trapezoidal cross-section. As a result, due to the trapezoidal shape, the drill plate is only tightened in the upper region of the receiving groove, even if the clamping screw is tightened by applying a large torque.

As another disadvantage, the location of the clamping screw and the location of the clamping slot must be arranged relative far away below the clamping contact (receiving groove) between drill plate and base body, because (in the plane above) the adjustment elements formed as threaded screws have to be arranged.

Since the elements are mounted in separate planes, a relatively large installation space is needed, which degrades the clamping action of the drill plate in the base body.

Adjusting the adjustment elements may also present a problem, because the adjustment elements may be moved unintentionally (or even intentionally), which can misalign the center position of the drill plate in the base body. A readjustment can then become quite complex.

In addition, this is a statically over determined system, because when the adjustment screws are strongly tightened for the preliminary attachment of the drill plate, the associated clamping jaws in the base body are already spread apart and therefore have to be moved towards each other and pressed against each other by tightening the clamping screw.

A transfer of high operating torques to the base body may also have the following disadvantage:

The corresponding clamping forces exerted on the drill plate are transmitted to the clamping jaws in the base body. The clamping jaws are therefore subjected to shear forces.

Because the clamping jaws are weakened by the clamping slot that extends downwardly from the groove bottom, the clamping jaws can inadvertently shear off for higher loads.

Disadvantageously, the trapezoidal centering groove receiving the drill plate is spread apart when high operating torques are transmitted, which causes high stress in the material of the clamping jaws in the base body. In addition, the drill plate is also subjected to shear forces, because it does no longer formfittingly contact the sidewalls of the deformed grooves, which may cause the drill plate to break apart.

It is therefore an object of the invention to modify a drill plate with a base body, so that the drill plate can be centered in the base body without additional adjustable stop elements, and so that greater operating torques can be transmitted to the drill plate without risking damage to the clamping jaws of the base body or to the drill plate.

BRIEF SUMMARY OF THE INVENTION

The object of the invention is solved in that at least two, with respect to the transverse center axis mutually opposing, centering fins are provided on the drill plate which contact associated stop faces located on the associated mounting jaws of the base body.

According to the invention, limit stops formed by threaded screws are thereby eliminated. Fabrication and adjustment of the drill plate are facilitated by arranging fixed centering fins.

According to an advantageous embodiment of the invention, at least one mounting screw that penetrates the two mounting jaws in the base body can extend through the drill plate.

The disclosed technical teaching provides the significant advantage that a bore for receiving a fastening screw is arranged in the drill plate itself. The drill plate is then no longer only indirectly tightened, as is the case in the state-of-the-art. On the other hand, the fastening screw disclosed in the aforedescribed DE 197 36 598 C2 was arranged below and outside the drill plate.

By arranging a fastening screw directly in the drill plate, the drill plate is advantageously pulled downwardly towards the groove bottom when the fastening screw is tightened, where it makes formfitting and force-transmitting contact.

Advantageously, the aforementioned opposing centering fins on the drill plate can be arranged below the bore for the mounting screw on the drill plate.

However, the invention is not limited to this embodiment. Alternatively, the opposing centering fins on the drill plate can be arranged at approximately the same height as the bore for the mounting screw on the drill plate.

It is known to provide a drill plate with a through-bore for a fastening screw in order to secure the drill plate with such fastening screw in the base body. This is disclosed, for example, in DE 198 34 635 A1. However, this arrangement has the disadvantage that the foot of the drill plate has a connector-shaped projection formed as pin that is formfittingly received and engages in a corresponding recess disposed in the bottom of the base body. Such type of pin can be subjected to large torques and can shear off when greater operating torques are applied.

With the present invention, instead of a pin located at the foot or bottom, diametrically opposed centering fins capable of transferring large torques can be arranged with a relatively large radial separation. The arrangement eliminates a stop (pin) located proximate to the rotation axis for transferring the operating torque, because according to the invention the centering fins are radially spaced apart and therefore better able to transfer a significantly greater operating torque to the base body.

According to a preferred embodiment of the invention, the centering fins are arranged approximately in the region of the bottom end face of the drill plate. However, the invention is not limited to this embodiment. Alternatively, as described above, the centering within can also have a corresponding axial distance from the base-side end face of the drill plate and hence be placed closer to the bore through which the fastening screw extends.

The closer the centering fins are moved upwardly towards the main cutting edges that transmit the torque, the smaller are the torque loads that have to be transmitted to the base body by the material of the drill plate. This significantly increases the service life of the drill plate, because it is no longer subjected to large torques, because the force is directly transmitted from the main cutting edges to the centering fins which have a small axial separation from the cutting edges.

The main force in metal-cutting machining is transmitted via the clamping jaws which form a large-area load-transmitting connection, thereby reducing the risk that the centering groove in the base body that receives the drill plate is inadvertently spread apart in this region.

The main load of the torque transmission is transmitted from the drill plate via short connecting paths to the corresponding clamping jaws in the base body, where it is received and transmitted by large-area stop faces, which are also located diametrically opposed with respect to the transverse center axis.

Advantageously, the position of the centering faces on the drill plate is approximately perpendicular to the axis of the mounting bore. In this way, the centering fins contact the corresponding stop faces in the base body first, before the fastening screw is tightened to achieve a clamping action.

The clamping action is achieved in a conventional manner by providing a clamping slot that extends from the bottom of the groove into the base body.

The clamping slot formed in the base body in the axial direction and oriented parallel to the centering faces causes first the centering faces to close, centering the drill plate, before the drill plate is clamped by the clamping faces. The centering and clamping operation take advantage of the elasticity of the fastening system of the base body.

In the present application, on one hand, the combination between a drill plate and a base body is claimed as an invention, and, on the other hand, also the drill plate alone.

Protection is sought for the drill plate independent of its attachment in a base body, because the drill plate itself includes inventive features.

For solving the object of achieving chip-breaking and centering during the drilling operation by a convex main cutting edge through a peeling cutting motion, it is additionally provided that the chip space is enlarged by a transition to a concave outlet edge.

The main cutting edge of the drill plate has hereby a convex shape and intersects with the tangent of the drill diameter at an angle of <90°, so that the relative cutting motion in the outer half of the diameter range has a "peeling" effect.

Conversely, the outlet edge of the drill plate has a concave shape so as to make the chip space as large as possible.

The chip face transitions continuously from the convex geometry of the main cutting edge into the concave geometry of the outlet edge, which improves chip breaking and optimizes chip removal.

According to the invention, a convex face is formed on the main cutting edge, which improves chip breaking, and a transition into a concave outlet edge, which improves chip removal.

According to an advantageous embodiment of the invention regarding the configuration of the drill plate, a special tip is arranged on the front side of the drill plate. These measures reduce the forces and optimize centering, because the resulting chips are short, thereby improving chip removal.

According to the invention, the chip face is extended or continued continuously without the edges and the chip angle is maintained into the region of the tip.

This represents a lengthened chip cutting face that continues without edges and steps to the tip.

The features of the invention relating to the combination of the drill plate and its attachment in the base body are characterized by an optimal reception and transfer of the chip cutting forces, while also attaining precise and a stable seating of the drill plate.

The drill plate is tensioned or clamped between the clamping jaws of the base body with the aforedescribed fastening screw.

The longitudinal axis of the fastening screw is formed so as to be oriented relative to the centering faces in the region of the centering groove of the base body in a particular manner.

First the centering function is achieved via the centering faces, whereafter the main clamping function is affected by the stop faces in the region of the fastening grooves of the base body.

The center axis of the countersunk portion of the fastening screw is displaced by a certain distance downwardly with respect to the center axis of the fastening bore of the drill plate, as measured in the axial contact face of the base body, so that the conical screw head is pressed downwardly in the counter bore of the mounting bore, when the fastening screw is tightened, thereby tensioning to the drill plate against the axial base-side contact face in the base body.

In this way, as discussed above, the base-side end of the drill plate is pressed against the bottom of the groove and secured therein when the fastening screw is tightened in the mounting bore of the base body.

This obviates the need for projections arranged on the base-side, as it is common in the state-of-the-art. The invention proposes instead to arrange diametrically opposing, widely spaced centering fins capable of transmitting a high load directly on the side faces of the drill plate.

The features of the present invention are not only recited in the individual claims, but are also encompassed by a combination of the individual claims.

All attributes and features disclosed in the application documents, including the abstract, in particular the spatial arrangement illustrated in the drawings, are claimed as an essential part of the invention, as far as they are novel in view of the state-of-the-art, either separately or in combination.

BRIEF DESCRIPTION OF THE SEVERAL VIEWS OF THE DRAWINGS

The invention will be described hereinafter with reference to one embodiment illustrated in the drawings. Additional features and advantages of the invention are disclosed in the drawings and their description.

It is shown in.

DETAILED DESCRIPTION OF THE INVENTION

Figure 1:
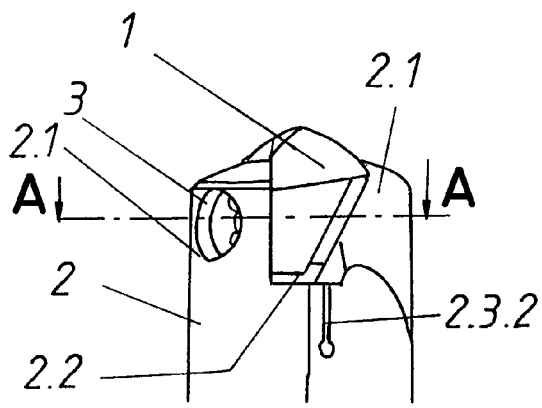
FIG. 1 schematically, a side view of a drilling tool.

FIG. 1 shows in general a drilling tool, which is fabricated from a base body 2 having a mounting groove 2.2 that is open toward the top and has mutually parallel stop faces 2.2.2.

The stop faces 2.2.2 are formed mirror symmetric with respect to a longitudinal center axis through the base body 2.

The parallel arrangement of the stop faces 2.2.2 forms a mounting groove with an approximate rectangular profile, which has the advantage that the stop faces 2.2.2 are capable of transmitting a high load across their entire cross-section.

According to another embodiment, the stop faces can also have a slightly conical shape which, however, degrades the load transfer.

A clamping slot 2.3.2 is arranged at the bottom of the centering groove 2.3 which extends downwardly into the material of the base body in the axial direction.

The side of the clamping slot terminating in the base body can, if necessary, be provided with a widening bore.

Accordingly, the mounting groove 2.2 is defined in the base body 2 by two mutually opposing, mirror-symmetric clamping jaws 2.1.

Figure 2:
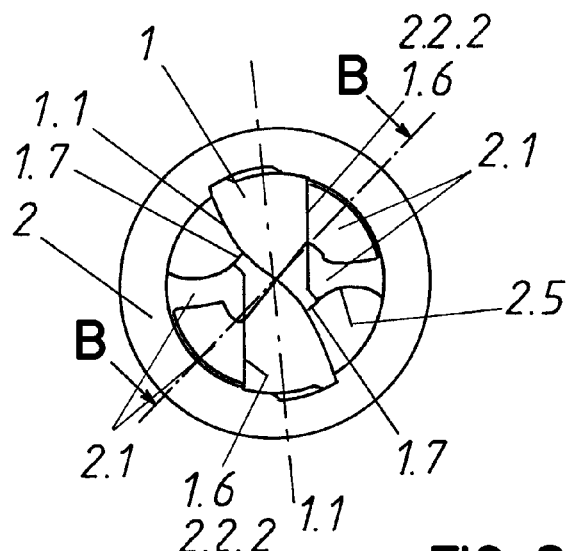
FIG. 2 a top view of the drilling tool.

FIG. 2 shows a top view on the drilling tool and a top view on the clamped drill plate 1.

As can be seen, lateral diametrically opposing centering fins 1.7 are formed on the drill plate 1 which contact corresponding centering faces 2.3.1 in the region of the centering grooves 2.3 of the clamping jaws 2.1.

Also visible are the diametrically opposed main cutting edges 1.1 of the drill plate 1. The main contact faces between the drill plate and the corresponding faces of the base body 2 are disposed in diametrical opposition from the centering fins 1.7.

It is also significant that the chip cutting face 1.2 of the drill plate 1 transitions into the centering fins 1.7 so as to protect the base body in this region against erosion caused by chip removal.

Figure 3:
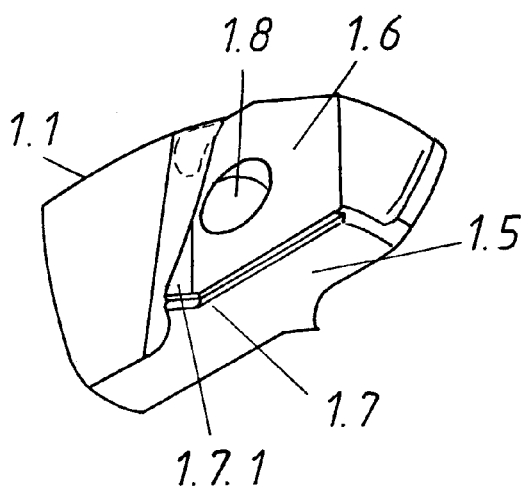
FIG. 3 a perspective bottom view of a drill plate.

FIG. 3 shows the base-side view of a drill plate 1 with the axial base-side contact face 1.5. As can be seen, the centering fins 1.7 according to the invention are diametrically opposed and have centering faces 1.7.1.

The centering faces 1.7.1 are somewhat rounded, triangular faces that extend from the base-side (from the axial contact face 1.5) with an upward conical taper.

However, the essential torque-transmitting faces are the stop faces 1.6 which have a large surface area and extend upwardly from the axial contact face 1.5 and are each penetrated by the mounting bore 1.8.

Figure 4:
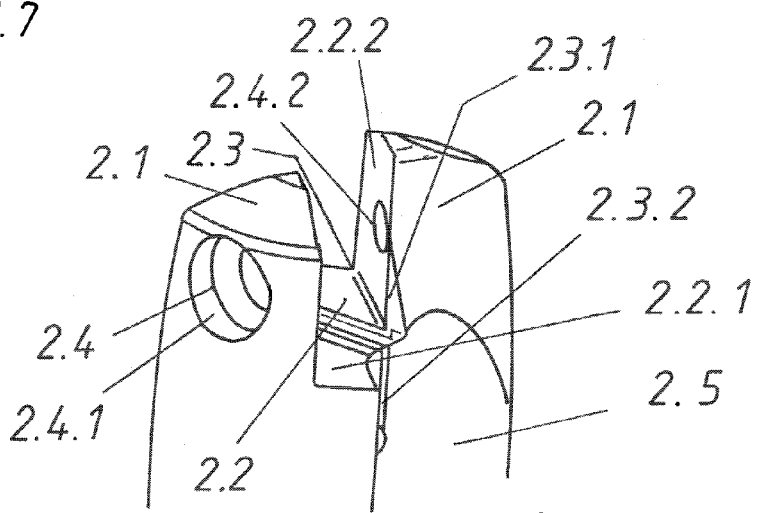
FIG. 4 the base body (holder)

FIG. 4 is a perspective view of the base body 2 with the formed centering groove 2.3 and the aforedescribed approximately parallel stop faces 2.2.2 that are symmetric relative to an axial longitudinal center direction. These stop faces 2.2.2 cooperate with the corresponding stop faces 1.6 of the drill plate 1.

As also seen in FIG. 4, the mounting bore 2.4 has a counter bore 2.4.1 in one (left) clamping jaw 2.1, whereas a thread 2.4.2 is formed in the opposing (right) clamping jaw 2.1.

The aforementioned centering fins 1.7 hereby contact the centering faces 2.3.1 formed with an acute angle in the region of the centering groove 2.3.

FIG. 4 also shows that the clamping slot 2.3.2 extends from the bottom of the centering groove 2.3 axially downwardly into the material of the base body 2.

Figure 5:
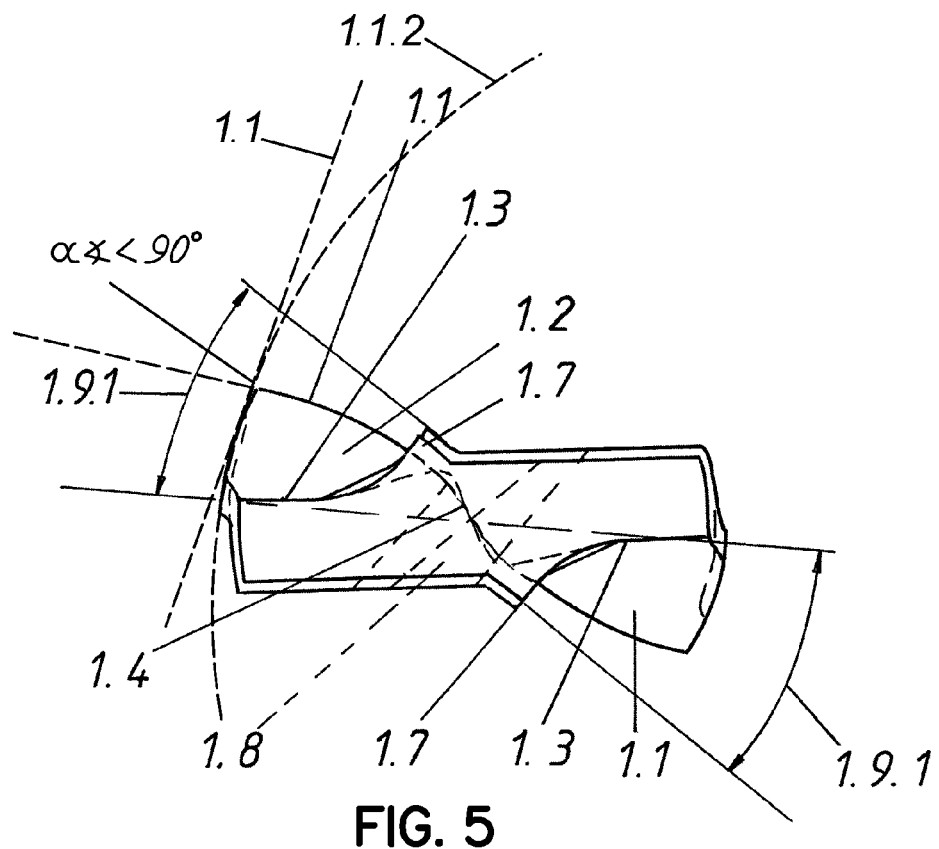
FIG. 5 a bottom view of the drill plate.
Figure 6:
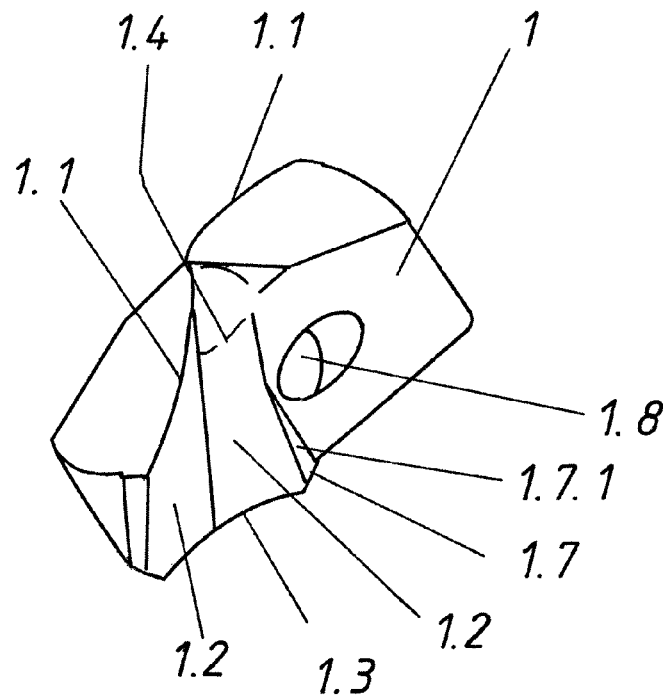
FIG. 6 a perspective side view of the drill plate.

FIGS. 5 and 6 show additional details of the drill plate 1. As can be seen, diametrically opposed main cutting edges 1.1 are provided which transition into each with an S-shape and hereby traverse or penetrate the tip 1.4.

The main cutting edges 1.1 hence form two convex cutting faces that in the top view appear as an S-shape.

As seen in FIG. 5, concave outlet edges 1.3 for the chip faces 1.2 are provided in opposition to the main cutting edges 1.1. The main cutting edge 1.1 of the drill plate 1 has hereby a convex shape and intersects with the tangent 1.1.1 of the drill diameter 1.1.2 at an angle of a<90°, so that the relative cutting motion in the outer half of the diameter range has a "peeling" effect.

FIG. 6 shows that the chip face 1.2 extends on both sides of an approximately vertical edge. However, this edge appears only at a result of the drawing. In reality, the chip face 1.2 for removal of chips is a continuous curve face that extends from the tip 1.4 downwardly and has a steady and continuous curvature.

According to FIG. 6, the centering fins 1.7 form inclined centering faces 1.7.1 that cooperate with the aforedescribed, likewise inclined and approximately acute centering faces 2.3.1 in the base body.

Figure 7:
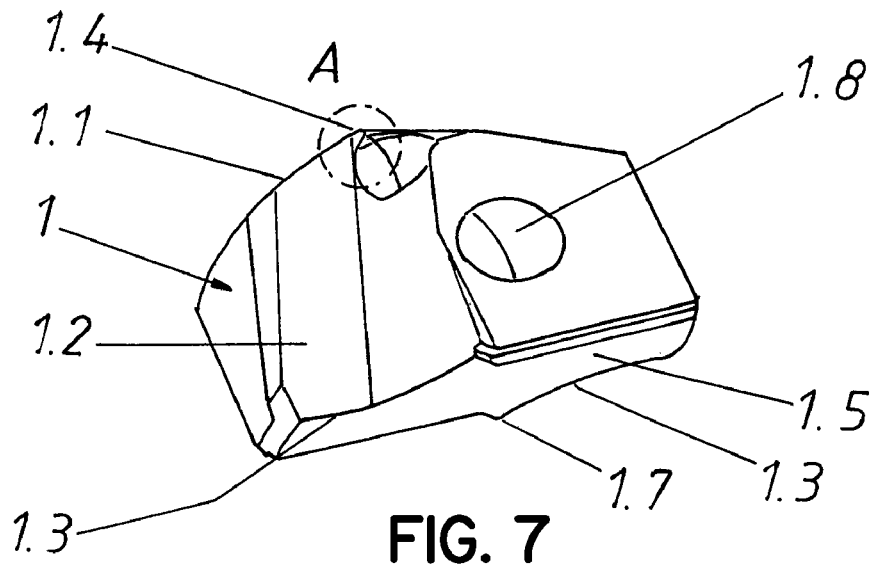
FIG. 7 a bottom view of the drill plate similar to that of FIG. 6.
Figure 8:
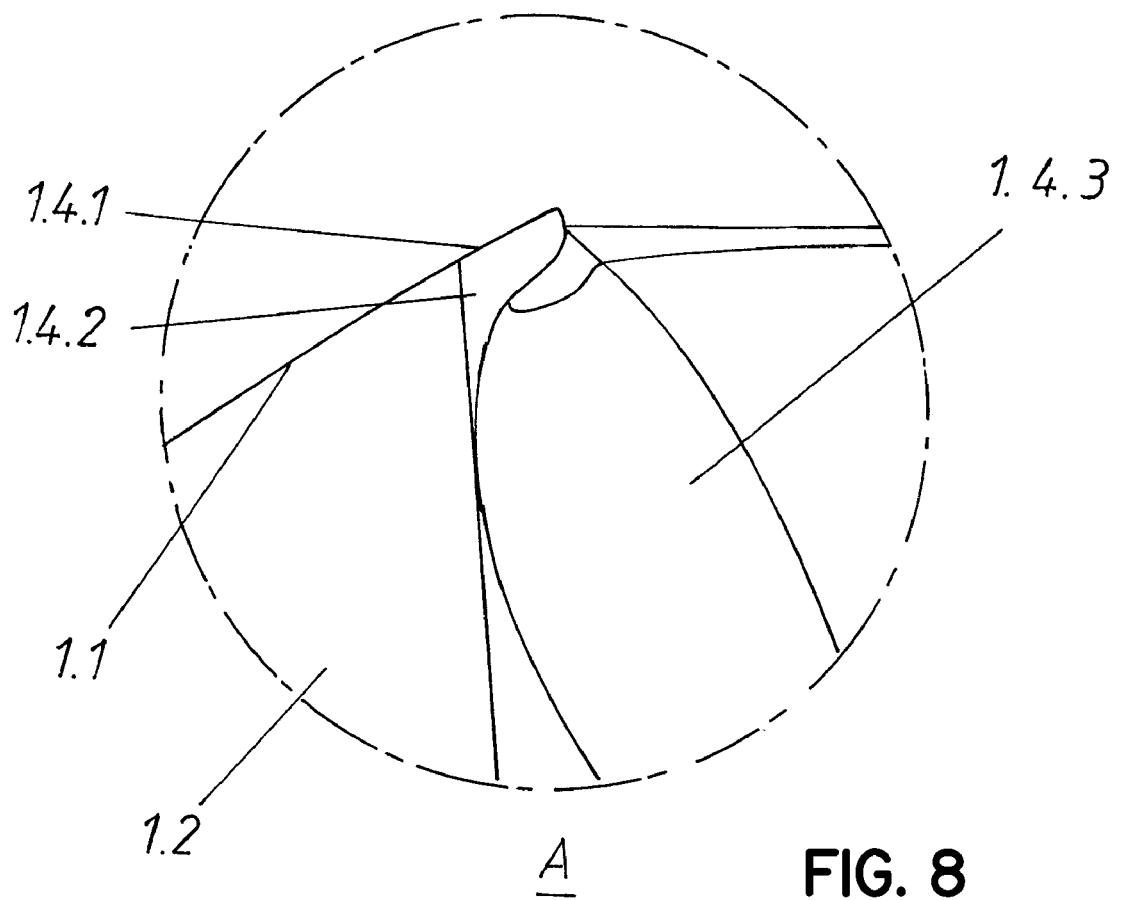
FIG. 8 a detail A of the illustration in FIG. 7.

FIGS. 7 and 8 show additional details of the drill plate 1 according to the invention.

It is significant that the cutting edge 1.4.1 according to FIG. 8 extends from an upper tip 1.4 that transitions flush into the main cutting edge 1.1. Accordingly, the main cutting edge 1.1 is extended by the additional cutting edge 1.4.1 into the region of the tip 1.4.

Another significant aspect is that the aforedescribed chip faces 1.2 extend into the region of the tip 1.4 in the form of extended chip faces 1.4.2.

Rounded secondary faces 1.4.3 are located laterally next to the extended chip faces 1.4.2, which together form the chip face 1.2 as a fully rounded, chip-removing face without interfering edges or protrusions.

The secondary faces 1.4.3 are secondary faces of the tip 1.4.

Figure 9:
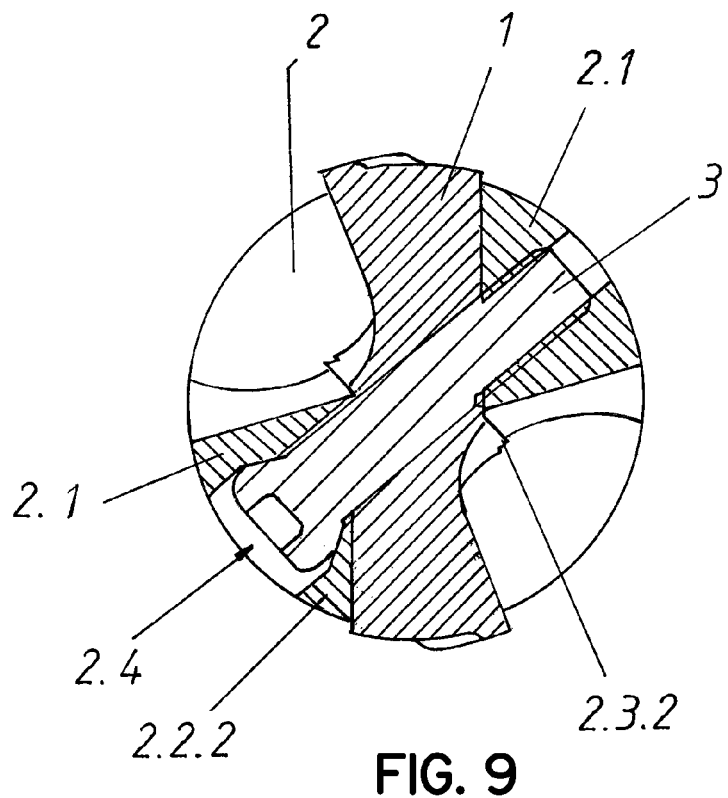
FIG. 9 a cross-section through the drilling tool at the height of line A-A in FIG. 1.
Figure 10:
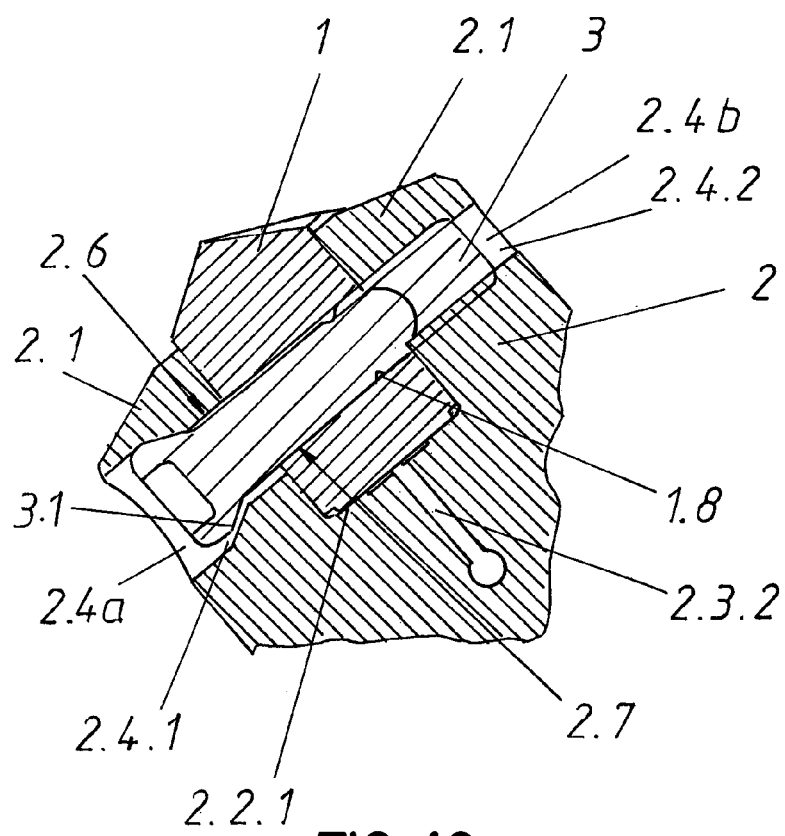
FIG. 10 a cross-section along the line B-B which is rotated 90° with respect to the cross-sectional view of Fig. A-A.

FIGS. 9 and 10 show additional details of the clamping attachment.

The mounting screw 3 has a conical screw head 3.1 which contacts a corresponding counter bore 2.4.1 in the region of the mounting bore 2.4.

Accordingly, the conical counter bore 2.4.1 in the left clamping jaw 2.1 makes contact in the left mounting bore 2.4 at a different location than the threaded shank 2.4.2 of the mounting screw 3 in the right mounting bore 2.4.

The two bores 2.4 in the opposing clamping jaws 2.1 are therefore slightly offset in the radial direction.

Stated differently, the longitudinal center axis through the left mounting bore 2.4 is not aligned with the longitudinal center axis through the right mounting bore 2.4. These two axes are offset relative to each other in the radial direction.

As a result, the conical screw head 3.1 contacts the counter bore 2.4.1, and the mounting screw tilts when it is tightened and extends at an angle into the opposing mounting bore 2.4*b*. Accordingly, at the position 2.6, which is in front of the position 2.7 in the axial direction, a tilting motion occurs, which causes the entire drill plate 1 to be pulled in the direction towards the groove bottom, where it is then formfittingly secured.

Simultaneously, the clamping slot 2.3.2 closes slightly and urges the diametrically opposed stop faces 2.2.2 into formfitting contact with the corresponding stop faces 1.6 of the drill plate.

With the drilling tool according to the invention, the drill plate is advantageously secured in a corresponding centering groove 2.3 in the base body 2 by a single mounting screw, without requiring additional adjusting means (such as additional threaded screws and the like).

This provides a connection capable of transferring a high load via large-area stop faces 1.6. The aforedescribed centering fins 1.7 according to the invention thereby only initially aid in centering the drill plate 1 in the base body 2, before the mounting screw 3 is tightened.

After the mounting screw 3 is tightened, two different stop faces are effective, namely the stop faces 1.6 capable of transferring a high load and the smaller centering fins 1.7 and the associated centering faces 1.7.1, which can also transfer a load.

A drill plate 1 according to the invention can transfer a high load and has a long service life, because deformation forces can be optimally transferred from the main cutting edges 1.1 to the base body 2.

It is important that the deformation forces are predominantly received by the mounting screw 3, which transfers these forces to the clamping jaws 2.1 of the base body 2.

The resulting connection is capable of transferring a high load and is protected from shear forces and wear. The arrangement of the centering fins 1.7 of the invention automatically centers the drill plate 1 in the base body 2.

The invention claimed is:

1. A drilling tool cutting insert adapted to be clamped in a rotatably driven drilling tool base body, the base body having a mounting groove formed in an end thereof defined by a pair of clamping jaws, each of the jaws having a bore therethrough, one of the bores being threaded, the bores for receiving a mounting screw for clamping said cutting insert in the mounting groove, each of the jaws having a stop face and a centering face on the stop face at an acute angle to the stop face, said cutting insert comprising: a plate-shaped cutting element having a first end, a second opposite end, and a bore therethrough for receiving the mounting screw, said first end of said cutting element having a pair of mutually opposing cutting edges, said element having a chip face extending from each said cutting edge to said second end of said element and having a stop face and a centering fin with a centering face located between said chip face and said stop face, said centering face at an acute angle to said stop face, said cutting element centering faces adapted to engage with the centering faces on the jaws of the base body to center said cutting insert in the base body, said cutting element centering faces and the centering faces on the jaws of the base body being the sole means of centering said cutting insert in the base body.

2. The cuffing insert of claim 1 wherein said centering fins extend between said bore and said second end of said cuffing element.

3. The cuffing insert of claim 1 wherein said centering faces of said centering fins are approximately perpendicular to an axis of said bore of said cuffing element.

4. The cuffing insert of claim 1 wherein said second end of said cuffing element is adapted to be pressed against a bottom of the mounting groove of the base body when the mounting screw is tightened in the base body.

5. The cuffing insert of claim 4 wherein each of the bores of the clamping jaws has a corresponding bore axis, the bore axes being arranged with a mutual radial offset.

6. The cuffing insert of claim 1 wherein the stop faces of the clamping jaws are oriented approximately parallel to each other.

7. The cuffing insert of claim 6 wherein the stop faces are formed diametrically opposed with respect to said centering fins.

8. The cuffing insert of claim 1 wherein said centering faces on said centering fins taper conically from said second end of said element toward said first end of said element and wherein the centering faces on the jaws of the base body are identically formed.

9. A drilling tool comprising: a drilling tool cutting insert, and a rotatably driven drilling tool base body, said base body having a mounting groove formed in an end thereof defined by a pair of clamping jaws, each of said jaws having a bore therethrough, one of said bores being threaded, said bores for receiving a mounting screw for clamping said cutting insert in said mounting groove, each of said jaws having a stop face and a centering face on said stop face at an acute angle to said stop face, said cutting insert comprising: a plate-shaped cutting element having a first end, a second opposite end, and a bore therethrough for receiving the mounting screw, said first end of said cutting element having a pair of mutually opposing cutting edges, said element having a chip face extending from each said cutting edge to said second end of said element and having a stop face and a centering fin with a centering face located between said chip face and said stop face, said centering face at an acute angle to said stop face, said cutting element centering faces adapted to engage with said centering faces on said jaws of said base body to center said cutting insert in said base body, said cutting element centering faces and the centering faces on the jaws of the base body being the sole means of centering said cutting insert in the base body.

10. The drilling tool of claim 9 wherein said centering fins extend between said bore and said second end of said cuffing element.

11. The drilling tool of claim 9 wherein said centering faces of said centering fins are approximately perpendicular to an axis of said bore of said cuffing element.

12. The drilling tool of claim 9 wherein said second end of said cuffing element is pressed against a bottom of said mounting groove of said base body when the mounting screw is tightened in said base body.

13. The drilling tool of claim 12 wherein each of said bores of said clamping jaws has a corresponding bore axis, said bore axes being arranged with a mutual radial offset.

14. The drilling tool of claim 9 wherein said stop faces of said of said clamping jaws are oriented approximately parallel to each other.

15. The drilling tool of claim 14 wherein said stop faces are formed diametrically opposed with respect to said centering fins.

16. The drilling tool of claim 9 wherein said centering faces on said centering fins taper conically from said second end of said element toward said first end of said element and wherein said centering faces on said jaws of said base body are identically formed.

\* \* \* \* \*

UNITED STATES PATENT AND TRADEMARK OFFICE
CERTIFICATE OF CORRECTION

| | | |
|---|---|---|
| PATENT NO. | : 7,740,427 B2 | |
| APPLICATION NO. | : 11/961697 | |
| DATED | : June 22, 2010 | |
| INVENTOR(S) | : Heule et al. | |

It is certified that error appears in the above-identified patent and that said Letters Patent is hereby corrected as shown below:

Claim 7, column 8, line 32 reads "7. The cuffing insert of claim 6 wherein the stop faces are"; line 32 should read --7. The cutting insert of claim 6 wherein the stop faces are--.

Claim 8, column 8, line 35 reads "8. The cuffing insert of claim 1 wherein said centering faces"; line 35 should read --8. The cutting insert of claim 1 wherein said centering faces--.

Claim 10, column 8, line 63 reads "extend between said bore and said second end of said cuffing"; line 63 should read --extend between said bore and said second end of said cutting--.

Claim 11, column 8, line 67 reads "axis of said bore of said cuffing"; line 67 should read --axis of said bore of said cutting--.

Claim 12, column 9, line 2 reads "said cuffing element is pressed against a bottom of said"; line 2 should read --said cutting element is pressed against a bottom of said--.

Signed and Sealed this
Thirty-first Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,740,427 B2 | |
| APPLICATION NO. | : 11/961697 | |
| DATED | : June 22, 2010 | |
| INVENTOR(S) | : Heinrich Heule and Harry Studer | |

It is certified that error appears in the above-identified patent and that said Letters Patent is hereby corrected as shown below:

Title page, item (57) Abstract, each instance of "cuffing" should read --cutting--.

In the Claims

Claim 2, column 8, line 16 reads "2. The cuffing insert of claim 1 wherein said centering fin"; line 16 should read --2. The cutting insert of claim 1 wherein said centering fin--.

Claim 2, column 8, line 17 reads "extend between said bore and said second end of said cuffing"; line 17 should read --extend between said bore and said second end of said cutting--.

Claim 3, column 8, line 19 reads "3. The cuffing insert of claim 1 wherein said centering faces"; line 19 should read --3. The cutting insert of claim 1 wherein said centering faces--.

Claim 3, column 8, line 2 reads "axis of said bore of said cuffing element."; line 21 should read --axis of said bore of said cutting element.--.

Claim 4, column 8, line 22 reads "4. The cuffing insert of claim 1 wherein said second end of"; line 22 should read --4. The cutting insert of claim 1 wherein said second end of--.

Claim 4, column 8, line 23 reads "said cuffing element is adapted to be pressed against a bottom"; line 23 should read --said cutting element is adapted to be pressed against a bottom--.

Claim 5, column 8, line 26 reads "5. The cuffing insert of claim 4 wherein each of the bores of"; line 26 should read --5. The cutting insert of claim 4 wherein each of the bores of--.

Claim 6, column 8, line 29 reads "6. The cuffing insert of claim 1 wherein the stop faces of the"; line 29 should read --6. The cutting insert of claim 1 wherein the stop faces of the--.

Signed and Sealed this
Twenty-ninth Day of September, 2015

Michelle K. Lee
*Director of the United States Patent and Trademark Office*

UNITED STATES PATENT AND TRADEMARK OFFICE
CERTIFICATE OF CORRECTION

Page 1 of 2

PATENT NO. : 7,740,427 B2
APPLICATION NO. : 11/961697
DATED : June 22, 2010
INVENTOR(S) : Heinrich Heule and Harry Studer It is certified that error appears in the above-identified patent and that said Letters Patent is hereby corrected as shown below:

Title page, item (57) Abstract, each instance of "cuffing" should read --cutting--.

In the Claims

Claim 2, column 8, line 16 reads "2. The cuffing insert of claim 1 wherein said centering fin"; line 16 should read --2. The cutting insert of claim 1 wherein said centering fin--.

Claim 2, column 8, line 17 reads "extend between said bore and said second end of said cuffing"; line 17 should read --extend between said bore and said second end of said cutting--.

Claim 3, column 8, line 19 reads "3. The cuffing insert of claim 1 wherein said centering faces"; line 19 should read --3. The cutting insert of claim 1 wherein said centering faces--.

Claim 3, column 8, line 21 reads "axis of said bore of said cuffing element."; line 21 should read --axis of said bore of said cutting element.--.

Claim 4, column 8, line 22 reads "4. The cuffing insert of claim 1 wherein said second end of"; line 22 should read --4. The cutting insert of claim 1 wherein said second end of--.

Claim 4, column 8, line 23 reads "said cuffing element is adapted to be pressed against a bottom"; line 23 should read --said cutting element is adapted to be pressed against a bottom--.

Claim 5, column 8, line 26 reads "5. The cuffing insert of claim 4 wherein each of the bores of"; line 26 should read --5. The cutting insert of claim 4 wherein each of the bores of--.

This certificate supersedes the Certificates of Correction issued May 31, 2011 and September 29, 2015.

Signed and Sealed this
Twenty-seventh Day of October, 2015

Michelle K. Lee
*Director of the United States Patent and Trademark Office*

CERTIFICATE OF CORRECTION (continued)
U.S. Pat. No. 7,740,427 B2

Claim 6, column 8, line 29 reads "6. The cuffing insert of claim 1 wherein the stop faces of the"; line 29 should read --6. The cutting insert of claim 1 wherein the stop faces of the--.

Claim 7, column 8, line 32 reads "7. The cuffing insert of claim 6 wherein the stop faces are"; line 32 should read --7. The cutting insert of claim 6 wherein the stop faces are--.

Claim 8, column 8, line 35 reads "8. The cuffing insert of claim 1 wherein said centering faces"; line 35 should read --8. The cutting insert of claim 1 wherein said centering faces--.

Claim 10, column 8, line 63 reads "extend between said bore and said second end of said cuffing"; line 63 should read --extend between said bore and said second end of said cutting--.

Claim 11, column 8, line 67 reads "axis of said bore of said cuffing"; line 67 should read --axis of said bore of said cutting--.

Claim 12, column 9, line 2 reads "said cuffing element is pressed against a bottom of said"; line 2 should read --said cutting element is pressed against a bottom of said--.